US012674757B2

(12) United States Patent
Recker et al.

(10) Patent No.: US 12,674,757 B2
(45) Date of Patent: Jul. 7, 2026

(54) METHOD OF PREPARING SURFACES COMPRISING INSPECTING SURFACE

(71) Applicant: Corrosion Innovations, LLC, Houston, TX (US)

(72) Inventors: Andrew Recker, Warrensville HTS, OH (US); James J. Knocke, Houston, TX (US); Marlin Lester, Houston, TX (US)

(73) Assignee: Corrosion Innovations, LLC, Houston, TX (US)

( * ) Notice: Subject to any disclaimer, the term of this patent is extended or adjusted under 35 U.S.C. 154(b) by 0 days.

(21) Appl. No.: 18/750,719

(22) Filed: Jun. 21, 2024

(65) Prior Publication Data

US 2024/0426753 A1      Dec. 26, 2024

Related U.S. Application Data

(60) Provisional application No. 63/509,726, filed on Jun. 22, 2023.

(51) Int. Cl.
*G01N 21/64*        (2006.01)
*B05D 3/12*         (2006.01)
*B05D 7/14*         (2006.01)

(52) U.S. Cl.
CPC .............. *G01N 21/64* (2013.01); *B05D 3/12* (2013.01); *B05D 7/14* (2013.01)

(58) Field of Classification Search
CPC ...... G01N 21/64; G01N 21/91; G01N 21/643; G01N 2021/646; B05D 3/12; B05D 7/14; B05D 3/002; B05D 2202/00
USPC ........................................... 106/14.05, 14.11
See application file for complete search history.

(56) References Cited

U.S. PATENT DOCUMENTS

| | | | | |
|---|---|---|---|---|
| 2,920,203 | A * | 1/1960 | Switzer .................. | G01N 21/91 252/301.19 |
| 3,575,873 | A * | 4/1971 | Carver ................. | C09D 175/08 252/301.36 |
| 4,820,344 | A * | 4/1989 | Geke ....................... | C23C 22/78 510/264 |
| 8,496,762 | B2 * | 7/2013 | Zoboli .................... | C23C 22/34 106/14.05 |
| 9,782,804 | B1 | 10/2017 | Hatle et al. | |
| 11,047,804 | B2 * | 6/2021 | Weinmeister ...... | G01N 21/8851 |
| 11,078,386 | B2 * | 8/2021 | Emerson ............... | C09D 5/002 |
| 11,459,525 | B2 | 10/2022 | Knocke et al. | |
| 11,584,900 | B2 | 2/2023 | Knocke et al. | |
| 2006/0244961 | A1 * | 11/2006 | Cole ....................... | A61B 5/441 356/319 |
| 2008/0305244 | A1 * | 12/2008 | Cui .......................... | B05D 5/06 427/9 |
| 2015/0017736 | A1 * | 1/2015 | Satzger .................. | G01N 21/91 436/172 |
| 2015/0147466 | A1 * | 5/2015 | Dellock ................... | B60Q 3/68 427/157 |
| 2016/0252462 | A1 * | 9/2016 | Bons ...................... | G01N 21/91 252/301.19 |
| 2017/0261313 | A1 * | 9/2017 | Bergren ................. | G01B 11/22 |

FOREIGN PATENT DOCUMENTS

CA          2137298 A1 *   4/1996

* cited by examiner

*Primary Examiner* — William P Fletcher, III
(74) *Attorney, Agent, or Firm* — Fox Rothschild LLP

(57)                ABSTRACT

Provided are methods and compositions for assessing a surface to be ready for subsequent treatment. A photoluminescent dye is used in the rinsing stage by mixing it with water and a non-fugitive chemical/inhibitor, leaving a film on the surface. Alternatively, the surface is treated with an acidifier solution containing a photoluminescent dye to ensure complete coverage. The surface is rinsed with an alkaline solution including a fugitive chemical to indicate complete removal of the gel. The dye emits photoluminescence under UV light, indicating film thickness. In the evaluation stage, an inspector checks photoluminescence. Photoluminescence intensity to determine readiness for treatment. If the surface fails, the surface is rinsed further with water to remedy the failure. Otherwise, the surface is subject to subsequent treatment. Semi-durable coatings requiring additional application can be identified by weak or lack of photoluminescent intensity.

10 Claims, 1 Drawing Sheet

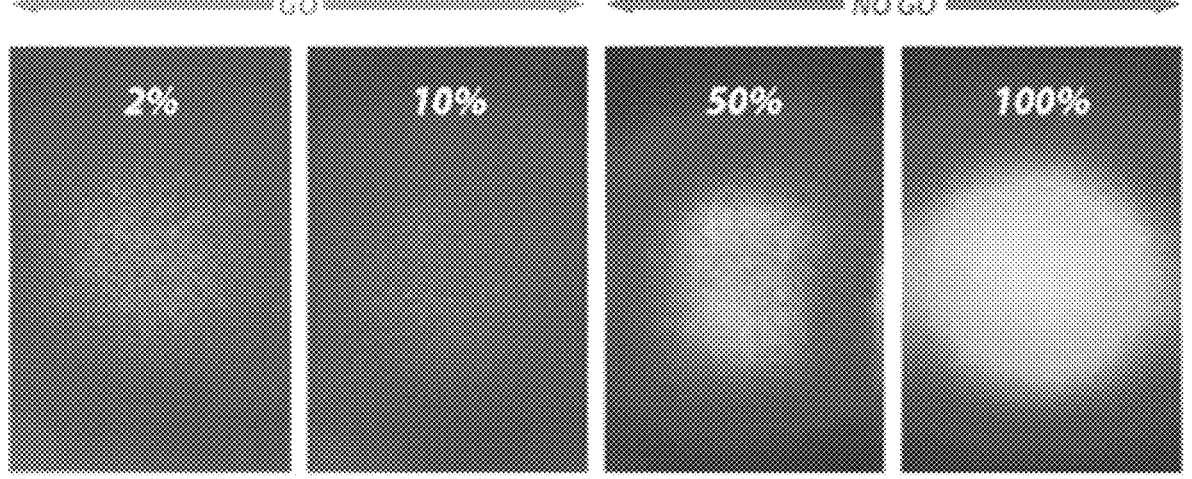

METHOD OF PREPARING SURFACES COMPRISING INSPECTING SURFACE

CROSS-REFERENCE TO RELATED APPLICATION

This application claims priority to U.S. Provisional Patent Application Nos. 63/509,726, "METHOD OF PREPARING SURFACES COMPRISING INSPECTING SURFACE," filed Jun. 22, 2023, the entire contents of which are incorporated herein by reference.

BACKGROUND

Technical Field

Embodiments of the present disclosure generally relate to methods and compositions for assessing whether a surface is prepared for subsequent treatment, specifically in industrial settings where metal surfaces require maintenance and upkeep. This maintenance includes treatments that prepare surfaces for the application of paint or primer to prevent rust or other concerns. Effective preparation and long-term maintenance can lead to considerable cost savings and improvement in facility management.

Background

Prior technologies, including the Applicant's Corr-Ze 100 patents (e.g., U.S. Pat. No. 11,584,900), have focused on creating products that are fugitive, meaning they do not leave a film after application. This characteristic is generally beneficial for subsequent coating or painting process because it ensures that no residues interfere with the adhesion of the new coatings.

However, a need exists for a product that does leave a microscopic film but without any accumulation of non-fugitive chemicals, inhibitors or any other particles due to pooling or collecting during the rinse due to uneven substrate that may detrimentally affect the coating adhesion, which is essential for preventing the substrate from corroding for a longer duration.

SUMMARY

The present disclosure, in some embodiments, may be directed to a method of inspecting a surface. The method may include rinsing the surface with a medium comprising a photoluminescent dye, a non-fugitive chemical and water; applying ultraviolet light to the surface; and determining from photoluminescence emitted from the surface if the surface is prepared for subsequent treatment.

In some embodiments, the non-fugitive chemical is triethanolamine (TEA). TEA may be the most common amine used to hold a blast, in other words, to prevent flash rusting on steel prior to coating. Other amines and functional groups containing amines can be used.

Non-fugitive chemicals may include other amines, imidazolines, phosphate esters, small chain carboxylic acids, and metal salts, thereof.

Preferably, the non-fugitive chemical is one or more of the following: a corrosion inhibitor, a lubricant, a penetrant, a semi-permanent film former, and/or a cleaner.

Applications that utilize the non-fugitive chemical may contain polymers, including polymers incorporating functional groups that will aid in one or more of the following: 1—lubrication; 2—penetration; 3—corrosion inhibition; and 4—electron transport.

For corrosion inhibitors, lubricants, penetrants, and other process fluids used in applications, not limited to metal working, drilling, production applications, it would be beneficial to have a simple inspection method to indicate when reapplication of the semi-permanent film is required. This process should support preventive maintenance efforts.

The thickness of the inhibitor can be of importance when equipment is exposed to the elements or mechanical friction. Visual inspection can determine when additional applications need to be added to the substrate.

The method may further include rinsing the surface with water, a water-based rinse, and/or a non-fugitive solution.

The method may further include applying a mechanical cleaning operation, blast pressure cleaning operation, or both to the surface. Preferably, the mechanical cleaning operation or the blast pressure cleaning operation may include an abrasive, ultra-high pressure, vapor blasting, slurry blasting, hand, mechanical, or laser blasting preparation of the surface.

Preferably, the subsequent treatment may include coating or painting.

Preferably, the surface may be a metal surface.

If the photoluminescence emitted from the surface is on or above a threshold level, and below the maximum recommended usage, the surface may be rinsed further with water or non-fugitive solution.

If the photoluminescence emitted from the surface is below a threshold level, the surface may be treated with the subsequent treatment.

A visual inspection or a device may be used to measure the photoluminescence.

An energy source is applied to the substrate to achieve the photoluminescence.

The method may be performed by a human, robot, drone, or a combination thereof.

The present disclosure may be also directed to a surface treated, other than a durable coating, and/or inspected by the aforementioned method.

In some embodiments, the present disclosure may be directed to a method of inspecting a surface. The method may include applying to the surface an acidifier solution (e.g., gel) containing a photoluminescent dye; rinsing the surface with an alkaline solution containing a fugitive chemical; applying ultraviolet light to the surface; and determining from the low or lack of photoluminescence emitted from the surface if the surface is prepared for subsequent treatment. In other words, the gel is tested to ensure all areas are properly coated, and testing after the rinse, along with the lack of photoluminescence emitted, confirms that the gel has been completely removed from the surface.

Preferably, the rinsing media can be a solution containing dimethylethanolamine (DMEA).

The method may further include rinsing the surface with water or non-fugitive solution.

The method may further include applying a mechanical cleaning operation, blast pressure cleaning operation, or both to the surface. Preferably, the mechanical cleaning operation or the blast pressure cleaning operation may include an abrasive, ultra-high pressure, vapor blasting, slurry blasting, hand, mechanical, or laser blasting preparation of the surface.

Preferably, the subsequent treatment may include coating or painting.

Preferably, the surface may be a metal surface.

If the photoluminescence emitted from the surface is on or above a threshold level, the surface may be rinsed further with water or non-fugitive solution.

If the photoluminescence emitted from the surface is below a threshold level, the surface may be treated with the subsequent treatment.

It should be noted that photoluminescence (PL) is not observed for metals, which lowers the possibility of interference.

Also provided is a method of inspecting a surface, the method comprising: applying to a surface a semi-permanent film former solution comprising a photoluminescent dye and one or more of a corrosion inhibitor, a lubricant, and a penetrant; applying ultraviolet light to the surface; and determining from photoluminescence emitted from the surface if the surface requires reapplication of the semi-permanent film. If the photoluminescence emitted from the surface is below a threshold level, the surface may be retreated with the semi-permanent film former solution. A user may set a threshold level that determines if the surface is sufficiently treated. This threshold may vary depending on the applications and would be understood by those having ordinary skill in the art. Before the retreatment, the surface may be rinsed with water or non-fugitive solution and/or treated with a mechanical cleaning operation, blast pressure cleaning operation, or both to the surface.

The present disclosure may be also directed to a surface treated and/or inspected by the aforementioned method.

All methods of application and inspection may be performed manually, by robotics or drones, or by combinations thereof.

BRIEF DESCRIPTION OF DRAWINGS

The nature and various advantages of the present disclosure will become more apparent upon consideration of the following detailed description, taken in conjunction with the accompanying drawings, in which like reference characters refer to like parts throughout, and in which:

FIG. 1 illustrates four metal surfaces with different levels of photoluminescence after rinsing the surfaces with a medium comprising a photoluminescent dye, water and a non-fugitive chemical/inhibitor.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure as defined by the appended claims.

DETAILED DESCRIPTION

Further in relation to this, before explaining at least the preferred embodiments of the present disclosure in greater detail, it is to be understood that the present disclosure is not limited in its application to the details of construction and to the arrangements of the components set forth in the following description. It would be understood by those of ordinary skill in the art that embodiments beyond those described herein are contemplated, and the embodiments can be practiced and carried out in a plurality of different ways. Also, it is to be understood that the terminology used herein is for the purpose of description and should not be regarded as a limiting factor.

Unless otherwise defined, the terms used herein refer to that which the ordinary artisan would understand such term to mean based on the contextual use of such term herein. To the extent that the meaning of a term used herein as understood by the ordinary artisan based on the contextual use of such term differs in any way from any particular dictionary definition of such term, it is intended that the meaning of the term as understood by the ordinary artisan will prevail.

As used herein, the term "substantially free of" means being present in an amount less than about 10 ppm.

As used herein, the term "free of" means being present in an amount of 0 ppm or in a non-detectable amount.

As used herein, the term "about" means approximately or nearly and in the context of a numerical value or range set forth herein means ±10% of the numerical value or range recited or claimed.

As used herein, the term "ultra-high pressure blasting (UHP)" means the use of ultra-high-pressure water, with or without the addition of other liquids or solid particles, to remove unwanted matter from various surfaces, and where the pump pressure exceeds about 30,000 psi (about 2,041 bar).

As used herein, the term "high pressure blasting (HP)" means the use of high-pressure water, with or without the addition of other liquids or solid particles, to remove unwanted matter from various surfaces, and where the pump pressure is between about 5,000 psi (340 bar) and about 30,000 psi (2,040 bar).

As used herein, the term "low water pressure blasting" or "pressure cleaning" means the use of pressurized water, with or without the addition of other liquids or solid particles, to remove unwanted matter from various surfaces, and where the pump pressure is below about 5,000 psi (about 340 bar).

As used herein, the term "non-fugitive" means leaving a microscopic film on a surface after evaporation. For surfaces that are to have a protective coating applied subsequently, however, the application could be up to about a 10 mil thickness for surfaces that are not to be painted.

As used herein, a "metal surface" or "metal structure" means that the object has been substantially made of metal, including but not limited to carbon steel. If other materials are used in the object, they are present only in minor amounts. It is understood in this context that the metal surface can include contaminants such as paint (such as from a previous treatment) or rust (such as from field exposure) before the surface is prepared for treatment.

As used herein, the term "blast pressure cleaning operation" means power washing with water or aggregate using pressure at or between about 70 psi and about 55,000 psi.

The inventors have discovered, for example, a process for easily and accurately assuring the formation of a microscopic film that is substantially free or free of particles on a surface. This process utilizes a medium comprising a photoluminescent dye and a non-fugitive chemical/inhibitor that leaves the film. This is especially important, for example, in tanks where it could be harder to see the surface without exceptional lighting. The process generally includes a rinsing/cleaning stage, a UV light applications stage, and an evaluation stage.

The rinsing or cleaning stage is critical because any particles on the surface may interfere with the bonding of the paint or primer to the surface (e.g., metal surface). The surface may be treated with water (preferably, high-pressure water) before, during, or after the rinsing using the medium comprising a photoluminescent dye and a non-fugitive chemical/inhibitor. Preferably, the surface may be treated with water simultaneously with the rinsing using the medium, which enabling a single step rinsing or cleaning stage. In this case, the medium may further comprise water. However, the present disclosure is not limited to using a photoluminescent dye; it may also include other luminescent dyes such as a phosphorescent dye, a chemiluminescent dye, etc.

In the UV light application stage, ultraviolet light or black light may be applied to the surface to excite the photoluminescent dyes on the surface. The present disclosure is not limited to UV light and may include other energy sources. It may also be possible for a cathodic protection system to detect the excited state.

The light waves used can be specific wavelengths, a broader spectrum, or combinations thereof.

In the evaluation stage, an inspector may be able to determine if the surface is ready, or not, for subsequent treatment by measuring the amount of UV photoluminescence emitted from the photoluminescent dye on the surface. This can be achieved by using a standard panel with different application ranges. The standard should be used under the same environmental conditions as the treated surface, whether in sunlight or in a tank, to determine whether the application is within the acceptable range. In general, a brighter color may indicate failure. If the surface fails, it may be further rinsed with water or any non-fugitive solution suitable for rinsing in this disclosure to remedy the failure. Otherwise, the surface may proceed to the subsequent treatment.

While in some embodiments, the three stages are described to be separate, they may be reduced to one or two stages wherein a user conducts the stages simultaneously or concurrently. In some embodiments, the rinsing/cleaning stage may be conducted simultaneously or concurrently with the UV applications stage. In some embodiments, the UV applications stage mat be conducted simultaneously or concurrently with the evaluation stage. In some embodiments, the rinsing/cleaning stage, the UV application stage, and the evaluation stage may all be conducted simultaneously or concurrently. It may be also possible for the stages to be conducted in any sequence or repeated as necessary. The present disclosure is not limited to the aforementioned configurations or sequences.

Rinsing/Cleaning Stage

Exemplary rinsing/cleaning stages may include the following:

1. Application of Semi-Permanent Corrosion Inhibitors Prior to Protective Coating Applications This may involve applying a semi-permanent corrosion inhibitor directly to bare metal surfaces before coating. The inhibitor can be wiped off if needed but is meant to stay on the surface to prevent corrosion. These types of inhibitors may be used offshore, with excess wiped off as needed based on environmental conditions.

A photoluminescent dye may be used with the components. Preferably, the photoluminescent dye may be organic and/or inorganic and may be selected from pigments, dyes, phosphors, or a combination thereof. The light/energy waves emitted by the dye will be indicative of the presence or absence of semi-permanent coatings.

Exemplary Formulation 1 q.s. Water 15-40% Triethanolamine 0-5% Lactic acid 1-5% Ethylene diamine tetra acetic acid 0.1% Synbrite Flouro White BR1

2. Application Containing Semi-Permanent Coatings with One or More of the Following Components: Corrosion Inhibitor, Penetrant, Lubricant This may allow for applying one or more components to coated surfaces for corrosion inhibition, penetration of coatings, or lubrication. Examples given included corrosion inhibitors for offshore use and penetrants or lubricants for cutting or drilling applications. This application can use synthetic or petroleum-based systems. The oils used will dictate the physical properties, such as film thickness, ability to penetrate, and ability to block corrosive gases from reaching the substrate surface. Robots or drones may be used to apply corrosion inhibitors to all contact points for improved protection.

A photoluminescent dye may be used with the components. Preferably, the photoluminescent dye may be organic and/or inorganic and may be selected from pigments, dyes, phosphors, or a combination thereof. The light/energy waves emitted by the dye will be indicative of the presence or absence of semi-permanent coatings.

3. Two-Step Cleaning Process

The first step may use an acidic gel solution that contains a photoluminescent dye. The gel and dye are applied together to ensure complete coverage on surfaces like tanks. The gel solution could be applied after surface preparation, such as sandblasting.

The second step may use an alkaline rinse to remove the gel and dye. This confirms thorough cleaning, as any remaining luminescence from the dye would indicate a missed spot. Black or UV lights may be used during application and removal to more easily see coverage.

In some embodiments, a photoluminescent dye, for example, Synbrite Fluoro White BR9, may be used with an acidifier solution and an alkaline solution including fugitive chemical in a rinsing/cleaning stage. Preferably, an acidifier solution, whether liquid or gel, may contain a photoluminescent dye and may be first applied together to a surface, and an alkaline solution may be used for rinsing the surface. Illustrative acidifier solution and rinsing solution suitable for use with embodiments of the present disclosure are described in U.S. Pat. No. 9,782,804B1 (which is hereby incorporated by reference in its entirety). Preferably, the alkaline solution may be an aqueous dimethylethanolamine (DMEA) solution. The photoluminescent dye may be stilbene. Before or after being rinsed with the medium, the surface may be rinsed with water.

Preferably, the photoluminescent dye may be organic and/or inorganic and may be selected from pigments, dyes, phosphors, or a combination thereof.

In the rinsing/cleansing stage, in some embodiments, a photoluminescent dye may be used with a medium comprising non-fugitive chemical and water. A non-fugitive chemical leaves a film on the surface upon drying. Techniques illustratively described in U.S. Pat. No. 11,459,525B2 (which is hereby incorporated by reference in its entirety) can be used in embodiments of the present disclosure with a photoluminescent dye and non-fugitive chemical, which can be a non-fugitive amine. More preferably, the non-fugitive chemical is triethanolamine (TEA), if the surface is to be subsequently coated. The photoluminescent dye may be stilbene or stilbene-based, such as Synbrite Fluoro White BR1.

Exemplary Formulation 2 (Acidic Gel can be Made by Adding the Powder to Water.)

81.999% Citric acid 11.7% Xanthan gum 4.9% Sodium Persulfate 2.4% Sodium bisulfate 0.001% Synbrite Flouro White BR9

In desired embodiments, the surface treated with tap water (e.g., having 310 ppm of total solids in water) is substantially free of and has typically low levels of chlorides, nitrates, carbonates (e.g., oxides), sulfates (surface and ground water, the main sources for tap water, are loaded with sulfates), or salts thereof. More preferably, the surface treated with RO (reverse osmosis), DI (deionized), making it free of chlorides, nitrates, carbonates, sulfates, or salts thereof. DI and distilled are the purest, while RO is capable of making potable water or DI water, and purified water is typically free of visible contaminants. The preferred embodiment uses low conductivity water, and embodiments of this disclosure perform well with purified water. Purified water is water that has been mechanically filtered or processed to remove impurities and make it suitable for use. Distilled water was formerly the most common form of purified water, but research has shown that water is more frequently purified by other processes including capacitive deionization, reverse osmosis, carbon filtering, microfiltration, ultrafiltration, and ultraviolet oxidation.

In some embodiments of the present disclosure, the prepared or provided medium and/or water may be applied to a surface, preferably a surface made of metal, using pressure cleaning operation or action. This can include pressure water blasting such as ultra-high pressure blasting (UHP) (e.g., "hydrocat" UHP blasting system, "deckhog" UHP blasting system, "hand lances" UHP blasting system, "pipeline cleaning pig" UHP blasting system), above about 30,000 psi. The medium and/or water may be applied to a surface, preferably a surface made of metal, using high pressure blasting (HP) or low-pressure water blasting (or pressure cleaning). In some embodiments, the pump pressure used for pressure water blasting is at or above about 500, 750, 1,000, 1500, 2000, 3,000, 4000, 5,000, 7500, 10,000, 15000 or 20,000 psi. Other nozzle pressures are also contemplated or described.

In some embodiments, the medium and/or water may be applied to a surface, preferably a metal surface, using a mechanical cleaning operation or action blasting (e.g., vapor blasting) or mechanical abrasion method. Optionally, abrasive (e.g., Glass Beads, Garnet, Black Beauty Aggregate, Sodium Bicarbonate, Walnut Shell Aggregate, Sponge Aggregate) may be applied to the surface with the medium and/or water using ultra-high pressure blasting (UHP), high pressure blasting (HP), low pressure blasting (or pressure cleaning), vapor blasting or mechanical abrasion (e.g., bristle blaster).

Wet Abrasive Blast Cleaning (WAB) is the paint industry's term for including abrasives or solids, in low to ultra-high pressure water cleaning. WAB covers abrasives added to water streams or water added to abrasive streams, in amounts ranging from mostly abrasive with a little water to mostly water with a little abrasive, and can be used in embodiments of the present disclosure, for example, as mentioned herein. Generic terms to describe specific air/water/abrasive blast cleaning methods are water-shroud or wet-head blasting, wet blasting, low volume water abrasive blasting, and slurry blasting. Generic terms to describe specific water/abrasive blast cleaning methods are slurry blasting, abrasive water jetting (AWJ), or abrasive injected water jetting/blasting (AIWJ). For blasting with abrasives, it is commonly accepted that low salt levels on blast media result in a cleaner blast.

In some embodiments, the medium and/or water is applied after abrasive, ultra-high pressure, vapor blasting, hand, mechanical, or laser blasting preparation of the surface. In the instance, the medium and/or water applied to the surface after the surface preparation is preferably concentrated to afford optimal results and create minimum runoff. In some embodiments, the medium and/or water is only applied after the preparation/blasting process. To clarify, the above discussion of pressures is applicable to the various blasting or cleaning methods.

To further elaborate and clarify, the medium and/or water is applied to the surface that is the subject of the cleaning as part of a cleaning process that includes applying a physical cleaning action to the surface (as described mechanical or pressure cleaning action). The medium and/or water can be applied under high pressure (e.g., 500 psi or above) or at much lower pressure such as in vapor blasting in which a water mist is generated to suppress dust. In this case, the medium and/or water is applied using the mist, for example.

In some embodiments, the application of the medium and/or water and the mechanical or pressure cleaning operation are concurrent, simultaneous (e.g., simultaneous throughout), continuous (e.g., applied continuously and simultaneously), overlapping, or performed without overlap.

UV Application Stage

During the UV Application Stage, ultraviolet (UV) light or black light is applied to the surface. In some embodiments, a user may apply the UV light or black light using a light emitting device. Preferably, the light emitting device may be portable so that a user can use it on-site. In general, the UV light or black light used in the present disclosure may have a wavelength between about 400 nanometers on the visible light side and about 100 mm on the x-ray side. Within this range, a user may set both the wavelength and the intensity. In some embodiments, a user may use more than one wavelength and intensity.

Additionally, a user, for example, may set a distance between the UV light or black light emitting device and the surface to achieve consistent results. Still further, a user, for example, may set the duration for the UV light or black light emitted to the surface for consistent results. The particular settings of the device, not limited to the aforementioned ones, may vary depending on the applications and would be understood by those having ordinary skill in the art.

The simplest way may be to use a UV flashlight or UV inspection light. However, spectrophotometers may better quantify the intensity and wavelength of the emitted light, potentially leading to faster inspections and more comprehensive recordkeeping.

Evaluation Stage

Once UV light or black light is applied to the surface, a user may measure the photoluminescence resulting in from the UV light or black light by the naked eye or a measurement device (e.g., a portable device, glasses, etc.). A brighter, uneven, partial, and/or concentrated color may indicate more failure, suggesting the accumulation of non-fugitive chemicals/inhibitors or any other particles (e.g., triethanolamine (TEA) or acidifier gel) due to pooling or collecting during the rinse on an uneven substrate, which may detrimentally affect coating adhesion. If the level of inhibitor/non-fugitive material is too high, the coating will not perform optimally. Similarly, if other particles remain heavily on the surface, the coating will not perform optimally. A user may set a threshold level that determines if the surface is sufficiently treated. This threshold may vary depending on the applications and would be understood by those having ordinary skill in the art.

Before reapplication, it may be essential to remove any remaining film from the surface to ensure optimal adhesion of the new coating. This may be achieved using several methods. One effective method may be high-pressure water blasting, which may use a stream of water at high pressure to strip away residual coatings and contaminants. Alternatively, chemical stripping agents may be applied to dissolve the remaining film, followed by thorough rinsing with water to remove any chemical residues. Mechanical abrasion, such as sanding or grinding, may also be used to physically remove the film, creating a smooth and clean surface for reapplication. Each of these methods may ensure that the surface is properly prepared, allowing the new coating to adhere effectively and perform optimally.

As shown in FIG. 1, if the photoluminescence emitted from the surface is below a threshold level, it is considered 'Go'. In FIG. 1, the threshold level may be any particular percentage, subrange, or range between 10% and 50%. Those having ordinary skilled in the art may be able to recognize this by the naked eye using a light/energy source Alternatively, a device receiving and measuring the photoluminescence (e.g., spectrometer, fluorometer), which provides precise and quantifiable measurements, may be used to determine if the surface is sufficiently treated. The measured photoluminescent level may be normalized by the reference photoluminescent level that is measured on a surface without any particles. The device may indicate the word 'Go' or simply display a green color. In the case of 'Go' (e.g., 2% or 10%), the surface may proceed with the subsequent treatment. The subsequent treatment may include coating or painting.

If the photoluminescence emitted from the surface is at or above a threshold level, it is considered 'No Go'. Those having ordinary skilled in the art may be able to recognize this by the naked eye. If the evaluation is done through the naked eye or glasses, it is possible to use a few approaches to determine if a coating or reapplication is needed.

A user may use a color intensity reference chart that involves correlating specific photoluminescent intensities with coating conditions. This method may include comparing the observed photoluminescent intensity on the surface with the reference chart to determine if reapplication is necessary.

A user may also establish threshold indicators that require setting clear visual thresholds for acceptable and unacceptable photoluminescence levels. It is crucial to train personnel to recognize these thresholds. For example, bright, concentrated, or partial colors may indicate areas that need reapplication, while low or no photoluminescence suggests that the coating has been adequately removed.

A user may also use UV light and protective glasses that involves employing UV light and special glasses designed to enhance the visibility of photoluminescent dye. Inspecting the surface under UV light can reveal areas that glow brightly or unevenly, indicating insufficient coverage or areas that need reapplication. Uniform low or no glow may suggest the surface is adequately coated or cleaned.

Alternatively, a device receiving and measuring the photoluminescence may be used to determine if the surface is sufficiently treated. The measured photoluminescent level may be normalized by the reference photoluminescent level that is measured on a surface without any particle. The device may indicate the word 'No Go' or simply a red color. In the case of 'No Go' (e.g., 50% or 100%), the surface may be rinsed further with water or any non-fugitive solution suitable for rinsing in this disclosure to remove the remaining particles on the surface. After further rinsing, a user may repeat the UV application stage and the evaluation stage until the surface is sufficiently treated, which may be recognized by the naked eye or the measuring device.

The rinsing (before and after inspection) is performed in most applications using pressurized water.

The rinsing medium after inspection can be water or other applicable or similar rinsing medium.

It should be understood that variations, clarifications, or modifications are contemplated. Applications of the technology to other fields not mentioned are also contemplated.

Exemplary methods and compositions are described. Since numerous modifications and changes will readily be apparent to those having ordinary skill in the art, it is not desired to limit the present disclosure to only the exact constructions as demonstrated in this disclosure. Accordingly, all suitable modifications and equivalents may be resorted to falling within the scope of the present disclosure.

Thus, for example, any sequence(s) and/or temporal order of steps of various processes or methods that are described herein are illustrative and should not be interpreted as being restrictive except as it would be generally understood from the context and description. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present disclosure.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present disclosure.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Unless defined otherwise, all technical and scientific terms used herein have same meaning as commonly understood by the person of ordinary skill in the art to which this disclosure belongs.

Embodiments of the present disclosure can include methods and/or compositions.

It should be understood that the above description of the disclosure and specific examples, while indicating preferred embodiments of the present disclosure, are given by way of illustration and not limitation. Many changes and modifications within the scope of the present disclosure may be made without departing from the spirit thereof, and the present disclosure includes all such changes and modifications.

What is claimed is:

1. A method of inspecting a surface, the method comprising:

applying to the surface an acidifier solution containing a photoluminescent dye, rinsing the surface with an alkaline solution containing a fugitive chemical;

applying ultraviolet light to the surface; and determining from photoluminescence emitted from the surface if the surface is prepared for subsequent treatment.

2. The method of inspecting the surface of claim 1, wherein the fugitive chemical is dimethylethanolamine (DMEA).

3. The method of inspecting the surface of claim 1, the method further comprising:

rinsing the surface with water or non-fugitive solution.

4. The method of inspecting the surface of claim 1, the method further comprising:

applying a mechanical cleaning operation, blast pressure cleaning operation, or both to the surface.

5. The method of inspecting the surface of claim 1, the mechanical cleaning operation or the blast pressure cleaning operation comprises an abrasive, ultra-high pressure, vapor blasting, slurry blasting, hand, mechanical, or laser blasting preparation of the surface.

6. The method of inspecting the surface of claim 1, wherein the subsequent treatment comprises coating or painting.

7. The method of inspecting the surface of claim 1, wherein the surface is a metal surface.

8. The method of inspecting the surface of claim 1, wherein if the photoluminescence emitted from the surface is on or above a threshold level, the surface is rinsed further with water or non-fugitive solution.

9. The method of inspecting the surface of claim 1, wherein if the photoluminescence emitted from the surface is below a threshold level, the surface is treated with the subsequent treatment.

10. A surface treated and/or inspected by the method of claim 1.

\* \* \* \* \*